United States Patent [19]

Bergeron et al.

[11] Patent Number: 4,499,846
[45] Date of Patent: Feb. 19, 1985

[54] PLUNGER AND TRANSPARENT INDICATOR

[75] Inventors: Ned Bergeron; Theodore A. Stollberg, both of Houma, La.

[73] Assignee: B.W.B. Controls, Inc., Houma, La.

[21] Appl. No.: 450,119

[22] Filed: Dec. 15, 1982

[51] Int. Cl.³ .................. G01L 7/16; G01L 19/08
[52] U.S. Cl. ..................... 116/272; 116/276; 137/557; 350/112
[58] Field of Search ............ 116/277, 272, 276; 350/112

[56] References Cited

U.S. PATENT DOCUMENTS

| | | | |
|---|---|---|---|
| 2,616,941 | 11/1952 | Lasko | 350/112 X |
| 2,711,711 | 6/1955 | Harman | 350/112 X |
| 3,236,097 | 2/1966 | Tessmer | 116/34 R |
| 3,572,283 | 3/1971 | Ashman | 116/34 |
| 4,072,126 | 2/1978 | Kemp | 116/277 |
| 4,164,196 | 8/1979 | Stradella et al. | 116/272 |
| 4,369,728 | 1/1983 | Nelson | 116/276 |

Primary Examiner—Daniel M. Yasich
Attorney, Agent, or Firm—Bode & Smith

[57] ABSTRACT

An angulated indicator lens secured to the top portion of a relay valve for providing maximum refraction and dispersion of the several indicating colors on the valve stem indicating the operative or inoperative position of the valve. The lens is constructed of a unitary transparent body having an interior angulated, truncated surface of approximately 45° to the horizontal, with an exterior angulated, truncated upper viewing surface of approximately 54° to the vertical. The transparent lens body receives ambient colored light from the stem providing the maximum refraction of light onto the first interior angulated surface and directing the color to be indicated through the lens medium and onto the second exterior angulated truncated surface for maximum indicating area. A portion of the lens body is provided which is totally non-reflective and serves to shade the reflecting of that coloration of the valve stem which is not being indicating in order to avoid misreading of the valve as the valve shifts from an opened to a closed position. Distinctive markings are also included for indicating through the lens the operative or inoperative position of the stem for the color blind.

17 Claims, 7 Drawing Figures

PLUNGER AND TRANSPARENT INDICATOR

BACKGROUND OF THE INVENTION

1. Field of the Invention

The apparatus of the present invention relates to indicators with lenses. More particularly, the apparatus of the present invention relates to an indicator with lens for indicating changes in a system of variables by reflecting, refracting and dispersing particular information provided in a band on an internal stem through the top surface of the lens body.

2. General Background of the Invention

In various aspects of industrial and commercial uses, very often there is utilized a viewing lens to indicate to a viewer, or a person whose duty it is to monitor an indicator, the status of a particular system by color changes as viewed in the lens. For example, a standard commercial use of a viewing lens is a rotary type channel selector on a television set, wherein the selected channel number is viewed on the face of the indicator, normally through an internal light source, so that the person attempting to select a particular channel is able to read the channel number as it visually appears on the indicator.

In a common industrial use, indicators have been utilized on certain types of valves, in most cases, a relay valve, wherein the valve is variable between an open and shut position, the open position allowing flow of fluids through the valve to an actuator in order to allow an oil well or the like to continue in production. Should there be a failure in the system, the relay would "shut-in" due to a change in a measured quantity, and the valve would shift from an open to a closed position. By necessity, these valves are constantly monitored, so that when the valve does shift from open to closed, or closed to open, the operator of the system is aware of the shift in the valve, and the status of the system at that point. Of course, in order to facilitate an operator in knowing when a valve is in the open or closed position, a type of indicator has been used throughout the years, in oder to assist in that determination. What has become standard in the industry, is the use of a color-coded indicator, wherein "green" would signify the valve is in the open position, and "red" would signify the valve is in the closed position, thus indicating a problem in the system, and that the system is "shut-in".

One type of indicator that has been utilized has been the "Winkie" indicator, which is a rotary type of indicator with a spherical surface half green and half red such that when the valve is in the open position, the rotary ball or sphere of the indicator has been shifted so that the green color is apparent exterior to the valve, and a viewer simply looks at the rotary ball and the color green indicates that the system is in normal operation. Likewise, when flow is interrupted through the relay valve, the ball shifts back to the red half of the sphere, and the red is indicted exterior to the valve, thus the operator on viewing red, knows that the system has shut-in.

Since this particular type of "Winkie" indicator requires the mechanical manipulation of a rotary ball within the valve, often times the indicator ball is quite inefficient in indicating a true reading of the valve state, and therefore has led to problems. In order to overcome these problems, a different type of indicator has been utilized wherein the valve provides an internal stem which moves longitudially within a bore in the valve so that internal pressure on the end of the stem provided with a piston would move the stem to an "up" position, and the loss of pressure on the same end of the stem would move the stem back to the "down" position. The head of the stem is provided with green and red bands of color which when shifted from the "down" to the "up" position, the red or green band of color respectively will appear through a lens provided at the top of the valve for indicating the position of the valve. In order to give the operator a better view of the red or green color indication, a type of "lucite" or plastic lens has been used which is a knob-type of indicator having a flat surface wherein the internal red or green color on the stem would be reflected, refracted and dispersed in such a way that a band of red or green respectively would appear through the top portion of the lens body, and thus give the reader a better read-out of the color. However, one of the shortcomings in this particular type of indicator lens is that the band of color on the stem, due to the shape of the indicator lens, is not properly reflected, refracted and dispersed so that a clear reading of the color indicated can be obtained. Therefore, should the operator be in a position not directly above the lens' upper or viewing surface, then he could observe a false reading of the operating state of the valve, which could lead to significant problems in the maintenance of the valve and system.

Several patents have been obtained which address the use of indicators in various fields of art, and these are as follows:

U.S. Pat. No. 2,711,711 issued to E. I. Harman entitled "Tuning Apparatus" teaches the use of a reflective lens for more properly viewing indicia on a television knob. In FIG. 2 thereof is illustrated a prism-type lens having an interior angulated surface and an exterior angulated surface, the combination of which readily reflects light originating from within the apparatus. However, this patent also teaches the use of an internal light source for projecting light onto the lens' surfaces and for the reflection of a particular number of the lens face rather than a band of color.

U.S. Pat. No. 3,636,915 issued to Ruppert entitled "Rotary Prism Display" teaches the use of an angulated internal translucent prism for illuminating images on a knob, particularly in the use of rotary control knobs and the like. This patent only shows one angulated surface, for receiving light from an internal source within the mechanism or from ambient room lighting.

U.S. Pat. No. 2,172,316 issued to D. O. Sproule entitled "Indicating Instrument" also shows a singular angulated surface and an internal light source.

U.S. Pat. No. 2,616,941 issued to G. A. Lasko entitled "Indicating Apparatus" also teaches the use of a reflective lens for reflecting the light and an indicating means within the lens. This particular indicator is used primarily on a battery to show fluid levels and does not teach the use of a double angulated lens as in the present invention.

The patents listed below also were found in the art, and are less pertinent to the particular invention:

| U.S. Pat. No. | Inventor | Title |
| --- | --- | --- |
| No. 1,883,971 | Kryzanowsky | "Signaling Device" |
| No. 3,041,917 | Glatt | "Underwater Instrument Viewing Device" |
| No. 2,566,789 | Blackinton, et al | "Optical Sight Means For Indicating the Level of |

-continued

| U.S. Pat. No. | Inventor | Title |
|---|---|---|
| | | Liquids or Other Reflective Surfaces" |
| No. 2,334,479 | Creager | "Tell-Tale Device" |
| No. 3,899,187 | Kisselmann, et al | "Indicating Instrument" |

GENERAL DISCUSSION OF THE PRESENT INVENTION

The apparatus of the present invention solves the shortcomings in the present state of the art in a simple and straightforward manner. There is provided an angulated indicator lens secured to the top portion of a relay valve or the like for providing maximum refraction and dispersion of the several indicating colors on the valve stem indicating respectively the operative or inoperative position of the valve. The lens generally comprises a lens body having an interior angulated, truncated surface of approximately 45° to the horizontal, with an exterior angulated, truncated upper surface of approximately 54° to the vertical. In the preferred embodiment, the transparent lens body would receive ambient colored light from the stem providing the maximum refraction of light onto the first interior angulated surface and directing the color (usually red or green) to be indicated through the lens medium and onto the second exterior angulated, truncated surface for maximum indicating area. There is further provided a portion of the lens body which is totally non-reflective and serves to shade the reflecting of that coloration of the valve stem which is not being indicated in order to avoid misreading of the valve as the valve would shift from an open to a closed position. There is further provided means for indicating through the lens the operative and inoperative position of the stem for the color blind.

Therefore, it is an object of the present invention to provide an indicator lens for indicating changes in the operating condition of a valve.

It is a further object of the present invention to provide an indicator lens functional through use of ambient external light and readable at various positions about the exterior of the lens.

It is still a further object of the present invention to provide an indicating lens which is threadably mounted onto the top of an indicating valve for easy removal and replacement should the lens be in a flawed condition.

It is still a further object of the present invention to provide an indicator lens whereby a particular color provided on an internal valve stem would be reflected, refracted and dispersed as a color band and viewed through the upper portion of the lens body.

It is still a further object of the present invention to provide an indicator lens wherein the color not being indicated in the lens would be shaded to avoid the possibility of an improper reading of the operative or inoperative state of the valve.

It is still a further object of the present invention to provide means for indicating through the lens the operative and inoperative position of the stem for the color blind.

In order to accomplish the above objects of the present invention, it is a feature of the present invention to provide a transparent indicator lens having the ability to refract and disperse an internally provided color through the upper surface of the lens body.

It is still another feature of the present invention to provide an indicator lens having a refractive surface for achieving maximum external readout of the color to be indicated.

It is still a further feature of the present invention to provide an indicator lens to receive ambient light from an external source and to reflect the color indicated on the internal stem of a valve onto a refractive lens surface and then through such refractive surface to a viewing surface.

It is still a further feature of the present invention to provide color band markings on an internal valve stem for indicating through the lens the operative and inoperative positions of the stem for the color blind.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein.

DETAILED DESCRIPTION OF THE PREFERRED EMBODIMENT

Figure 1:
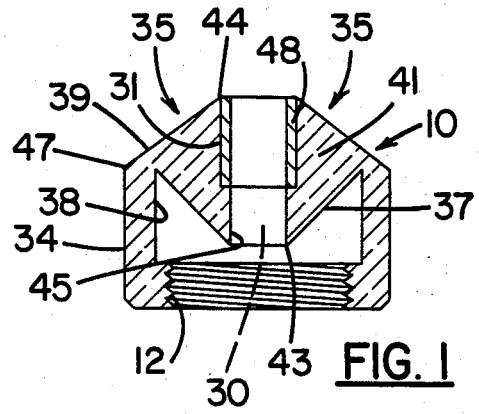
FIG. 1 is a cross-sectional view of the preferred embodiment of the apparatus of the present invention.

FIGS. 1 through 5 indicate the preferred embodiment of the apparatus of the present invention generally indicated by the numeral 10. Essentially, the apparatus would have a housing, wherein a linearly moveable member containing information would be positioned in a bore in the housing, with means for displaying the information substantially perpendicular to the information containing member. As illustrated in FIG. 1, in the preferred embodiment, indicating lens 10 would be an integrally or unitarily molded lens, constructed of a hard, durable and transparent plastic type material, commonly known as LUCITE, which is a trademark of DuPont Company, and which has reflective qualities similar to glass or the like. In its application, as discussed above, apparatus 10 would threadably engage, via threaded portion 12, upper or top threaded portion 16 of valve 20 such as any one of a number of pneumatic control valves manufactured by applicants' assignee. Apparatus 10 would provide a continuous side wall portion 34 vertically disposed and housing threaded portion 12 at its lower surface, for threading onto threaded top portion 16 of valve 20. Integrally attached at the uppermost portion of vertical, wall 34 is prismatic portion 35 which is a double truncated portion providing an internal truncated angulated refracting surface 37 and an external truncated, angulated viewing top surface 39, with a solid body portion 41 therebetween. In the preferred embodiment, interior surface 37 would extend from the uppermost portion of internal vertical wall 38 downward at an angle between 40° to 50° but, preferably at an angle of 45° to the horizontal or vertical, to a lowermost annular shoulder 43 intergrally forming the terminus of wall 45 of bore 30.

Similarly, exterior viewing surface 39 would extend from its lower most point 47 at exterior wall 34 upward at an angle of between 53.5° to 54.5°, but preferably 54.0° from the vertical, to an uppermost point 44 forming the upper terminus of bore wall 45 of bore 30. There is further provided within the top portion of indicator lens 10, and housed within the uppermost portion of bore 30, sleeve 48, which would generally be a metal sleeve housed within a counter bore 31 slightly larger than bore 30 so that counter bore 31's inner most diameter is equal to the interior diameter of bore 30, the function of which will be described further below. Also, as seen in FIG. 1, lens 10 is open-ended at both ends of bore 30, so that the longitudinal movement of internal stem 24 within bore 30 would allow internal stem 24 to protrude exterior to lens 10 during certain operating conditions, which will be explained more fully below.

OPERATION OF THE LENS

In the preferred embodiment, indicating valve 20 would be a type of relay valve, (For example Assignee's EHBI Relay or C-2 indicator) having an internal step 24 which would be slidably and linearly movable throughout bore 30 of indicating lens 10 and extend upward through counter bore 31 and thus through the body of indicating lens 10. In its typical operation, relay valve 20 would receive fluid pressure (instrument or pilot pressure) from an external source, and depending on the source and amount of force of the fluid on internal stem 24, the force would cause biasing of internal stem 24 upward and downward (longitudinally) within the body of valve 20, thus directing the flow of system or supply fluid through valve 20.

Figure 3:
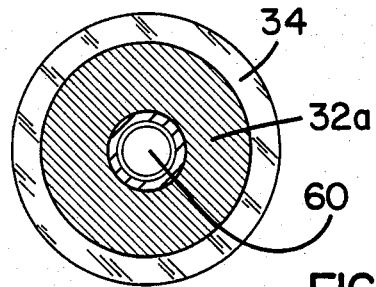
FIG. 3 is a top view of the preferred embodiment of the apparatus of the present invention of FIG. 2 indicating the reflection of the operative indicator color through the upper portion of the lens.
Figure 2:
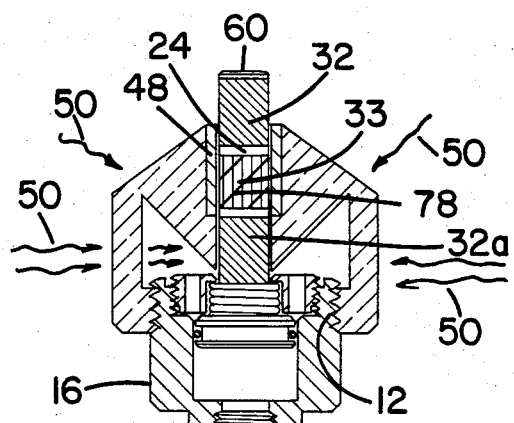
FIG. 2 is a cross-sectional view of the preferred embodiment of the apparatus of the present invention as employed with a relay valve in the operative state.

As described above, indicating lens 10 serves to indicate the status of valve 20 during its operative and non-operative conditions. As seen in FIGS. 2 and 3, when valve 20 is in the operative state, that is, in the "opened" position wherein internal stem 24 has moved upward and flow of fluid is allowed through valve 20, upper green band 32 is positioned exterior to indicator lens 10, for exterior side viewing; and red band 33 is screened from view due to its being located within the confines of metal sleeve 48. In the operative state of FIG. 2, interior green indicator band 32a is positioned in bore 30 between the lowermost end portion of sleeve 48 and annular shoulder 43 and is therefore viewable through transparent lens body 41. That being the case, in the operation of indicator lens 10 in the preferred embodiment, ambient light, as indicated by Arrows 50, would be received through indicator lens 10 and be reflected from interior green indicator band 32a, refracted onto internal angulated refracting surface 37 which, as indicated above, in the preferred embodiment would be at a 45° angle to the horizontal or vertical. Refracted green color band 32a would then be capable of being viewed through prismatic body 41 and through external viewing surface 39, which would be angulated at approximately 54° to the vertical in the preferred embodiment. External viewing surface 39 with its interface with the atmosphere would therefore project to the viewer green color band 32a at its optimum expanse or dispersion and magnification, thus indicating a band of green 32a as shown in FIG. 3 in top view. This combination of an internal angulated refracting surface and an external angulated viewing surface provides for a maximum viewable color through external angulated viewing surface 39 of lens 10.

Figure 5:
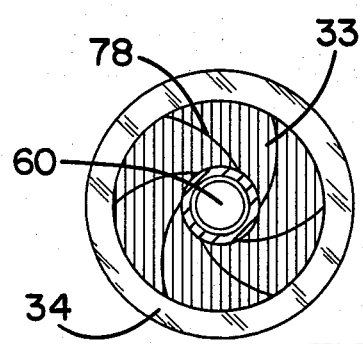
FIG. 5 is a top view of the preferred embodiment of the apparatus of the present invention of FIG. 4, indicating the non-operative state of the relay valve of the present invention.
Figure 4:
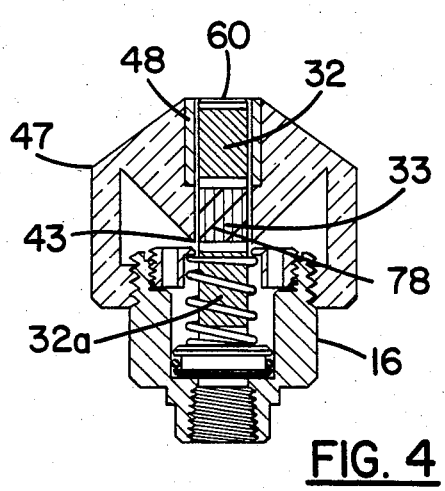
FIG. 4 is a cross-sectional view of the apparatus of the present invention with the relay valve in the non-operative state.

As seen in FIGS. 4 and 5, when internal stem 24 would shift to the non-operative positon, green color band 32 would shift downward so that it is completely surrounded by and shaded from view by metal sleeve 48, thus preventing any refraction of green color band 32 through lens 10. Likewise, red color band 33 has shifted into the viewing position, i.e., between the lowermost end of sleeve 48 and annular shoulder 43 and therefore, as described above, would undergo maximum refraction and dispersion through external viewing surface 39, thus indicating to the operator the non-operative state of the valve in use. Likewise, when the valve is in the non-operative position illustrated in FIG. 4, green color band 32a will have shifted into the body of valve 20 at top portion 16, so that the top portion 16 shades green band 32a from view through lens 10 and, therefore, only red band 33 is visible through indicator lens 10 as upper green band 32 is now within the confines of sleeve 48 and refraction is prevented. Also, internal stem 24 is topped off by metal stem cap 60, so that upper green band 32 cannot be viewed from the top while the indicator is in a non-operative position and red is being viewed through indicator lens 10. It is thus seen that sleeve 48 serves as a means for screening or preventing refraction of preselected portions of the information on internal stem 24 from view depending on the position of internal stem 24.

Annular wall portion 34 further provides a barrier means to confine the refraction of information along surface 37. When the information (or color) is refracted onto surface 37, the refraction is ended where surface 37 and internal wall 38 join, this being a "dead spot". Thus viewing is confined to and maximized in the area defined by the extrapolation of wall 38 onto external viewing surface 39 as best illustrated in FIGS. 3 and 5.

Figure 6:
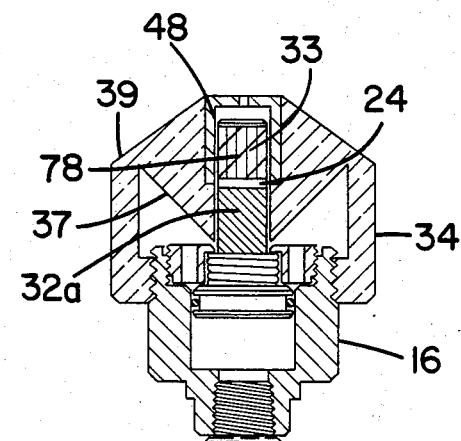
FIG. 6 is a cross-sectional view of an additional embodiment of the apparatus of the present invention indicating the operative state of the valve.
Figure 7:
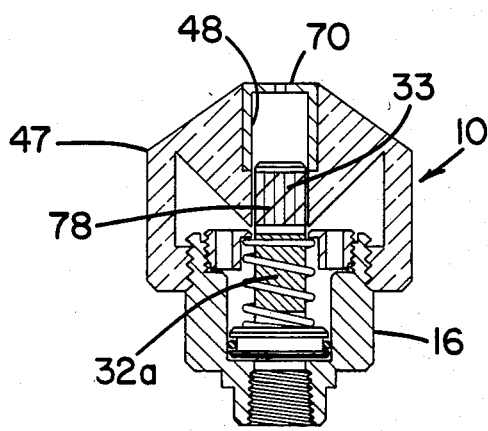
FIG. 7 is a cross-sectional view of the additional embodiment of the lens body of FIG. 6 indicating the non-operative state of the valve.

In FIGS. 6 and 7, there is further illustrated an additional embodiment of indicator lens 10 in combination with internal stem 24, wherein sleeve 48, within the confines of lens 10, is provided with cap 70 for enclosing and retaining internal stem 24 so that it cannot extrude from the upper portion of lens 10. In this particular embodiment, there is simply an upper red indicator band 33 and a lower green indicator band 32a, so that when the indicator is in the operative position as illustrated in FIG. 6, upper red band 33 is hidden from view due to its being confined within the confines of sleeve 48 and cap 70; and lower green indicator band 32a is in the position to be viewed through external viewing surface 39 of indicator lens 10 as in the preferred embodiment. Likewise, FIG. 7 illustrates the valve in the non-operative position, wherein internal stem 24 and therefore lower green indicator band 32a have been shifted downward from the position of FIG. 6 such that green indicator band 32a is positioned within the confines of upper valve portion 16 of valve body 20, and therefore is not visible through viewing surface 39, and upper red band 33 is in such a position within lens 10, that it may be refractively viewed through the viewing surface 39 of indicator lens 10 as is illustrated in FIG. 5.

The most relevent structural difference between the preferred embodiment and this particular embodiment, as illustrated in FIGS. 6 and 7, is that there can be no exterior protrusion of internal stem 24, as cap 70 is integral to collar 48, and thus not movable up and down. Thus, the upper green indicating band 32 in the alternate embodiment would never be viewable from a side view as is illustrated in FIG. 2. This embodiment therefore requires that the operator read the operative or non-operative condition of valve 20 through the viewing surface 39 of indicator lens 10 itself, unlike the preferred embodiment.

The industrial adoption of color coding to indicate operative and non-operative conditions creates the hazard of false or no indication to personnel who may be visually impaired by being color blind. To remedy this potential for failure, red indicating band 33 is provided with prominent diagonal markings 78 as illustrated in FIGS. 2, 4, 5, 6 and 7, preferably black in color for sharpness and contrast to serve as a means for indicating the red color or non-operative condition to the color blind. With green color indicators 32, 32a not provided with such markings, when a color blind operator views lens 10 through viewing surface 39, the presence of markings 78, as illustrated in FIG. 5, will indicate to him the non-operative state of valve 20, and the absence of markings 78, as illustrated in FIG. 3, will indicate to him the operative state of valve 20. This application for the color blind is suitable to both embodiments of apparatus 10.

Because many varying and differing embodiments may be made within the scope of the inventive concept herein taught; and because many modifications may be made in the embodiments herein detailed in accordance with the descriptive requirement of the law, it is to be understood that the details herein are to be interpreted as illustrative and not in a limiting sense.

What is claimed as invention is:

1. An indicating apparatus which comprises:
   a. a unitary transparent lens housing having an axial bore therethrough and a counter bore in the uppermost portion of said bore, said counter bore having a sleeve member therein;
   b. a single information-containing member at least partially positioned and linearly movable in response to fluid changing conditions in said apparatus within said bore in said housing, said member having at least two visually distinctive information portions viewable from a top view and side view through said housing; and
   c. means for displaying and refracting ambient light reflected by said information portions, comprising a double truncated prismatic lens intregral with said housing which slidably receives said information containing member in said axial bore and is substantially perpendicular to said information containing member.

2. The apparatus in claim 1, wherein said movable member is biased toward multiple positions relative to said housing.

3. The apparatus in claim 2, further comprising means for screening predetermined parts of said information from said displaying means as a function of the respective position of said movable member.

4. The apparatus in claim 1, wherein said lens further provides means to confine said refracted information within said viewing area.

5. The apparatus in claim 1, wherein said information displayed by said lens is magnified.

6. The apparatus in claim 1, wherein said lens includes refracting and viewing surfaces.

7. The apparatus in claim 6, wherein said refracting surface is angulated between 40° to 50° to the vertical.

8. The apparatus of claim 6 wherein said refracting surface is angulated at substantially 45° to the vertical.

9. The apparatus in claim 6, wherein said viewing surface is angulated between 53.5° and 54.5° to the vertical.

10. The apparatus of claim 6, wherein said viewing surface is angulated at substantially 54° to the vertical.

11. An apparatus for indicating a condition, said apparatus comprising:
    a. a unitary transparent cylindrical lens housing having an axial bore therethrough and a counter bore in the uppermost portion of said bore, said counter bore having a sleeve member therein;
    b. a single slide member moveable in response to fluid changing conditions in said apparatus within said bore between a first and second position and having at least two visually distinctive information portions on said slide member, viewable from a top view and side view through said housing;
    c. means for displaying information comprising a lens integral with said housing which magnifies said information and is formed by a doubled truncated prismatic portion at the upper portion of said housing which provides an internal refracting surface and an external viewing surface; and
    d. means for selectively transmitting information to said displaying means as a function of the position of said slide member comprising:
       i. a counter bore within the uppermost portion of said axial bore; and
       ii. an opaque sleeve member positioned within said counter bore for receiving one of said information portions, selectively preventing display of said information portion within said sleeve.

12. The apparatus in claim 11, wherein said housing further comprises inlet means, and said slide member further comprises a piston positioned against said inlet means when said slide member is in said first position.

13. The apparatus in claim 12, further comprising means for biasing said slide member towards said first position.

14. In an indicating apparatus, an indicator lens for indicating a particular color positioned within a bore in said lens, said lens comprising:
    a. a unitary transparent cylindrical lens body, said body having said bore extending therethrough, the bore having a counter bore formed toward the top portion of said bore, and an opaque sleeve provided therein;
    b. first interior truncated angulated refracting surface means for refracting said color within said bore;
    c. second exterior truncated angulated viewing surface means for receiving said refracted color from said first refracting surface means, the angulation of said first and second surface means in combination providing for maximum reflection of said color through said second exterior viewing surface means;

d. barrier means for confining said refraction of said color within an area along said refraction surface; and e. an information-containing member moveable in said bore in response to variable fluid conditions in said apparatus.

15. The apparatus in claim 14, further comprising said metal sleeve being the means positioned in said bore for receiving and preventing refraction of any additional colors within said lens bore while said particular color is in position for viewing.

16. The apparatus of claim 14 further comprising means incorporated in said particular color apparatus for indicating said particular color to the color blind.

17. The apparatus of claim 16 wherein said means for indicating said particular color to the color blind comprises diagonal markings contrasting with said particular color.

* * * * *